(12) United States Patent
Rempp

(10) Patent No.: US 9,797,517 B2
(45) Date of Patent: Oct. 24, 2017

(54) VALVE ASSEMBLY FOR SPRAYING DEVICES FOR AGRICULTURAL TECHNOLOGY AND FIELD SPRAYER

(71) Applicant: Wolfgang Rempp, Stuttgart (DE)

(72) Inventor: Wolfgang Rempp, Stuttgart (DE)

(73) Assignee: LECHLER GMBH, Metzingen (DE)

( * ) Notice: Subject to any disclaimer, the term of this patent is extended or adjusted under 35 U.S.C. 154(b) by 313 days.

(21) Appl. No.: 14/535,487

(22) Filed: Nov. 7, 2014

(65) Prior Publication Data

US 2015/0129686 A1 May 14, 2015

(30) Foreign Application Priority Data

Nov. 8, 2013 (DE) .................. 10 2013 222 743

(51) Int. Cl.
*H02K 5/10* (2006.01)
*F16K 11/20* (2006.01)
*A01M 7/00* (2006.01)
*F16K 31/04* (2006.01)
(Continued)

(52) U.S. Cl.
CPC .......... *F16K 11/20* (2013.01); *A01M 7/0089* (2013.01); *F16K 3/246* (2013.01); *F16K 31/04* (2013.01);
(Continued)

(58) Field of Classification Search
CPC ....................................... F16K 11/20
(Continued)

(56) References Cited

U.S. PATENT DOCUMENTS 4,960,242 A * 10/1990 Larson ................. E01C 19/176
239/168
5,744,923 A * 4/1998 Strauss ................... H02J 9/061
318/430
(Continued)

FOREIGN PATENT DOCUMENTS

DE         102 60 479 A1      7/2004
DE    10 2010 051 580 A1      5/2012
(Continued)

OTHER PUBLICATIONS

Office Action of German Patent Office issued in Application No. 10 2013 222 743.4 dated May 12, 2014 (7 pages).
(Continued)

*Primary Examiner* — David S Luo
(74) *Attorney, Agent, or Firm* — Flynn, Thiel, Boutell & Tanis, P.C.

(57) ABSTRACT

A valve assembly for spraying devices for agricultural technology having a plurality of valves, wherein the valves each include a valve body, which is capable of assuming at least one enable position and one disable position relative to a valve seat, an electric motor for moving the valve seat and/or the valve body into the enable position and the disable position, and an electric energy storage device for providing electric energy for the electric motor, wherein a voltage converter is provided and configured, in a first operation mode, to convert a first voltage provided by the energy storage device into a second, higher voltage to be applied to the electric motor during moving the valve body and/or the valve seat and, in a second operation mode, to charge the energy storage device with low power input.

14 Claims, 6 Drawing Sheets

(51) Int. Cl.
*H02K 5/22* (2006.01)
*H02K 7/14* (2006.01)
*F16K 3/24* (2006.01)
*H02K 7/06* (2006.01)

(52) U.S. Cl.
CPC ............... *H02K 5/10* (2013.01); *H02K 5/225* (2013.01); *H02K 7/06* (2013.01); *H02K 7/14* (2013.01); *Y10T 137/87772* (2015.04)

(58) Field of Classification Search
USPC ...................................................... 318/3, 34
See application file for complete search history.

(56) References Cited

U.S. PATENT DOCUMENTS

| | | | | |
|---|---|---|---|---|
| 7,549,436 | B2* | 6/2009 | Parsons | ..................... E03D 3/04 137/15.18 |
| 8,138,706 | B2* | 3/2012 | Ochsenbein | .......... H02J 7/0016 318/400.3 |
| 2010/0007301 | A1 | 1/2010 | Ochsenbein et al. | |
| 2012/0318592 | A1 | 12/2012 | Schmid et al. | |
| 2013/0234057 | A1 | 9/2013 | Muller | |

FOREIGN PATENT DOCUMENTS

| | | |
|---|---|---|
| DE | 10 2011 106 504 A1 | 12/2012 |
| DE | 10 2013 100 078 A1 | 8/2013 |
| EP | 0 889 266 A2 | 1/1999 |
| WO | WO 2007/134471 A1 | 11/2007 |

OTHER PUBLICATIONS

Search Report of European Patent Office issued in Application No. 14 18 9943 with English translation of category of cited documents dated Mar. 18, 2015 (7 pages).

* cited by examiner

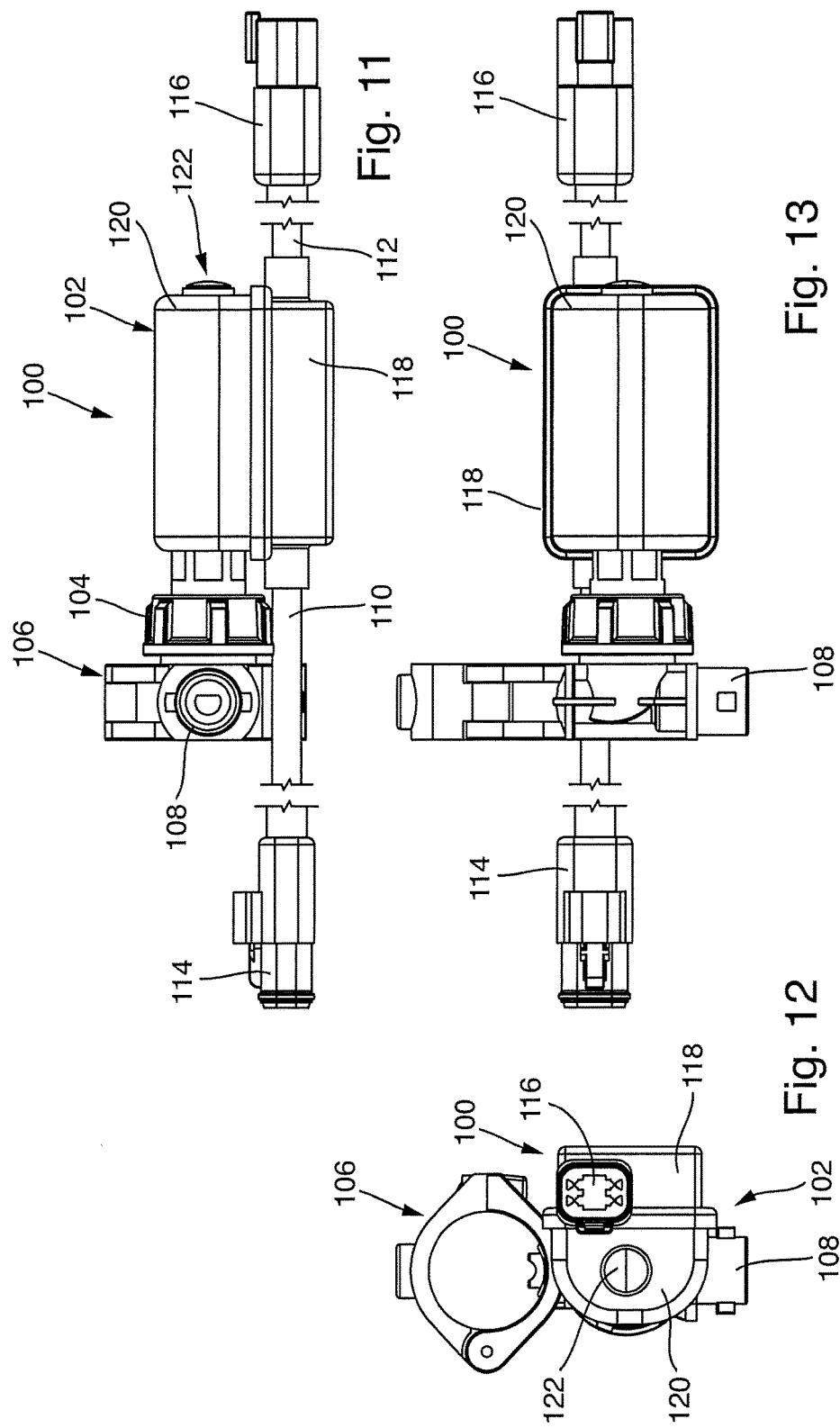

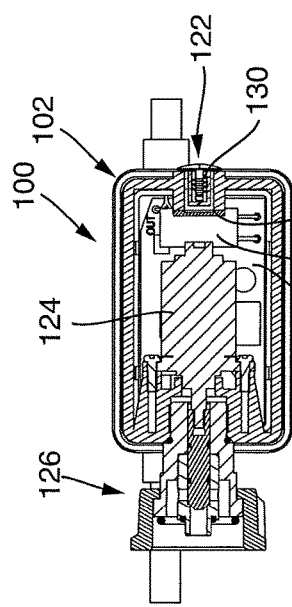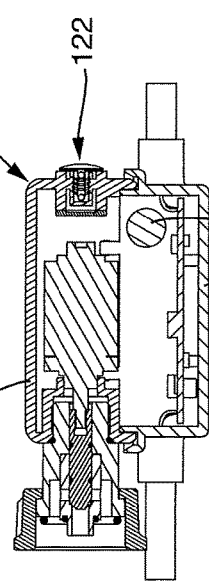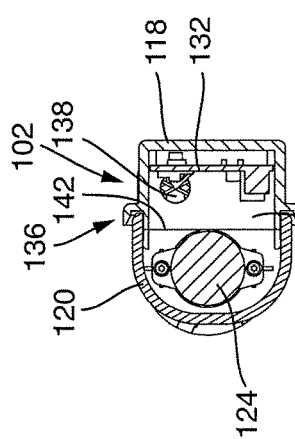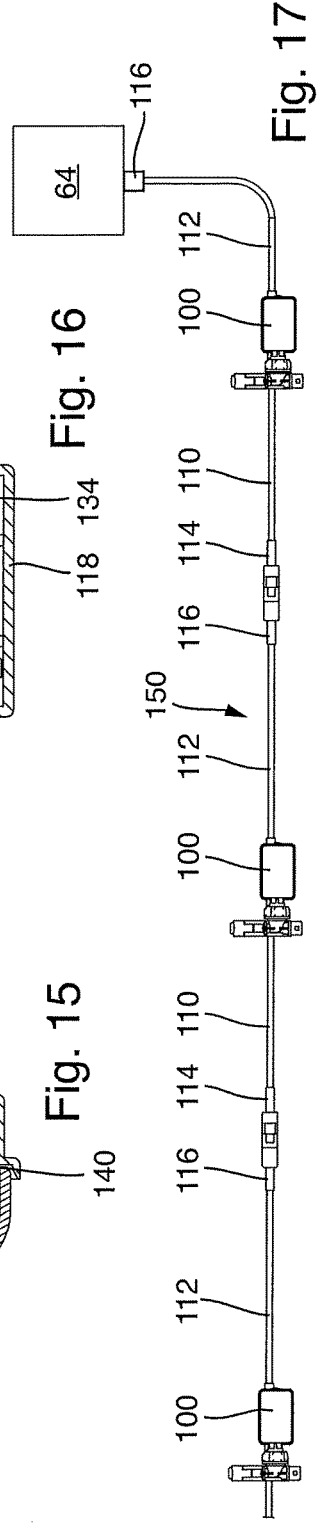

VALVE ASSEMBLY FOR SPRAYING DEVICES FOR AGRICULTURAL TECHNOLOGY AND FIELD SPRAYER

CROSS-REFERENCE TO RELATED APPLICATIONS

This application claims the priority of the German patent application DE 10 2013 222 743.4 the disclosure of which is hereby incorporated into this application by reference.

FIELD AND SUMMARY OF THE INVENTION

The invention relates to a valve assembly for spraying devices for agricultural technology, wherein the valves each include a valve body, which is capable of assuming at least one enable position and one disable position relative to a valve seat, an electric motor for moving the valve seat and/or the valve body into the enable position and the disable position, and an electric energy storage device for providing electric energy for the electric motor. The invention also relates to a field sprayer including a valve assembly according to the invention.

The aim of the invention is to provide an improved valve assembly for spraying devices for agricultural technology and an improved field sprayer.

Therefore, the valve assembly according to the invention comprises a plurality of valves, each including a valve body, which is capable of assuming at least one enable position and one disable position relative to a valve seat, an electric motor for moving the valve seat and/or the valve body into the enable position and the disable position, and an electric energy storage device for providing electric energy for the electric motor, wherein a voltage converter is provided and configured, in a first operation mode, to convert a first voltage provided by the energy storage device into a second, higher voltage to be applied to the electric motor during moving the valve body and/or the valve seat and, in a second operation mode, to charge the energy storage device with low energy input. The invention is based on the finding that in case of a failure of the wired or external power supply for an electric valve, even the voltage provided by an energy storage device on the valve itself is not in all conditions sufficient to displace the valve into a predefined position by means of the electric motor. Depending on requirements, this may be the enable position or the disable position. For example, a higher torque of the electric motor is needed temporarily, in order to move the valve body and/or the valve seat counter the actual liquid pressure. To produce such a higher torque of the electric motor, a voltage converter is provided which in a first operation mode, also referred to as boost operation mode, converts a first voltage provided by the energy storage device into a second, higher voltage to be applied to the electric motor during moving the valve body and/or the valve seat. Owing to the higher output voltage of the voltage converter, the electric motor can provide a sufficiently high torque and/or a sufficiently high number of revolutions to reliably close the valve even in case of a failure of the wired or external energy supply. Thus, the energy storage device as such can be comparatively small and low cost in structure, for example, using lower nominal voltage than the electric motor, and all the same allows to ensure that, in case of failure of the wired or external energy supply, the valve assumes the predetermined emergency position reliably. Furthermore, by means of the energy storage device can be ensured that even during normal operation, but without failure of the power supply of the field sprayer, all valves of the field sprayer can be opened or closed simultaneously, without overloading of the power supply.

The voltage converter is configured to charge the energy storage device with low power input in a second operation mode.

In such a so-called buck operation mode, the energy storage device can then be charged during a somewhat longer period of time using lower defined power input, so that the energy supply of the spraying device is not overloaded. Specifically, this allows a solution to the problem that with large spraying devices, for example, field sprayers, the electric system of a tractive vehicle does not have sufficiently high performance in order to supply the high number of valves simultaneously with sufficient electric energy to effect a simultaneous switching operation of all valves. Field sprayers may, for example, have a working width of 42 m, and commonly, there is a nozzle with a valve provided every 50 cm. With the simultaneous power consumption of 84 valves during an opening operation or a closing operation, the electric system of a tractive vehicle for the field sprayer will, in general, be overchallenged. Thus, using the invention ensures not only the simultaneous operation of all electric valves on a field sprayer, furthermore, in case of a failure of the electric energy supply, it still also allows displacing every valve into a predefined emergency position. Charging of the energy storage device is accomplished during the buck operation mode with low power input, so that the electric system of a tractive vehicle is not overloaded.

In an advanced embodiment of the invention, the voltage converter is configured to control or to regulate power input in a second operation mode.

This is to ensure that even with numerous valves present, there is no overloading of the power supply and all energy storage devices are charged at the same rate.

In an advanced embodiment of the invention, in a second operation mode, a third voltage for charging the energy storage device is lower than a supply voltage of the voltage converter.

These ways and means are also to ensure that the energy supply during charging of the plurality of energy storage devices is not overloaded, and specifically, that only part of the total power provided is used for charging of the energy storage devices.

In an advanced embodiment of the invention, the voltage converter is a direct current (DC) voltage converter.

Appropriate DC voltage converters are referred to as DC choppers, two-quadrant choppers, synchronous rectifiers, step-up/step-down choppers, or predominantly also as buck/boost converters. An essential feature is that, during motoric operation, the current flow passes from the energy storage device via the DC voltage converter to the electric motor, however, during charging operation, the current flow passes from an electric energy supply via the DC voltage converter to the energy storage device.

In an advanced embodiment of the invention, the energy storage device is a capacitor, in particular a supercapacitor.

Capacitors, in particular supercapacitors, are comparatively compact in structure and, nonetheless, provide a high electric energy density. Supercapacitors can be so-called supercaps, electric double-layer capacitors (EDLCs), electrochemical capacitors, or hybrid capacitors. A common feature with all capacitors is that they can be charged during a somewhat longer period of time with lower power input, but they are adapted to provide high electric power in the short-run for motoric operation.

In an advanced embodiment of the invention, a valve housing is provided, wherein the electric motor, the voltage converter and a valve control circuit for the electric motor and the voltage converter are arranged within the valve housing, and wherein the voltage converter, the energy storage device and the valve control circuit are encased by a water-tight potting compound.

In this manner, very short signal pathways can be realized during transmission of signals. This also allows arrangement of the electric motor, the voltage converter and the valve control circuit for the electric motor and the voltage converter protected within the valve housing. Advantageously, the energy storage device itself is also arranged within the valve housing. By potting the electronics, they are reliably shielded from atmospheric exposure, but also from adverse effects of agricultural pesticides or cleaning agents, for example, during high-pressure cleaning.

In an advanced embodiment of the invention, a cover of the valve housing is sealed by means of the potting compound.

By potting the cover and the housing, the electric motor disposed within the valve housing can also be shielded from external impacts.

In an advanced embodiment of the invention, the valve housing is provided with a ventilation hole, wherein the ventilation hole is closed using a water-tight but air-permeable membrane.

Attaching an air-permeable but water-impermeable membrane allows pressure compensation, for example, in the presence of severe temperature variations. Formation of condensed water within the housing is prevented. Thereby, the electric motor disposed within the valve housing is protected. The membrane is attached to the housing in such a manner, for example, sunk-in below a perforated protective cover, that cleaning of the field sprayer by means of a high-pressure cleaner may not damage the membrane.

In an advanced embodiment of the invention, the electric motor is a step motor. Advantageously, a screw spindle driven by the electric motor is provided for moving the valve body.

By means of a screw spindle, high breakaway torques and high holding forces for the valve body and/or the valve seat can be generated. Advantageously, the screw spindle is self-locking. The use of a step motor allows adjusting the rotational position of the step motor to a predetermined value using the valve control circuit without additional sensors.

In an advanced embodiment of the invention, the valve housing is provided with two electric plug connectors.

In this manner, valves arranged side by side on a field sprayer can be interconnected by easily to be plugged-in cables. Thereby, a modular construction is obtained. Thus, for equipment of a field sprayer with the valves according to the invention and, in particular, for wiring these valves, standardized cables each including two plug connectors can be used, and there is no need for a specific cable assembly. Typically, in field sprayers, the nozzle supports with the valves are spaced 50 cm apart. In case pre-assembled cables each including two plug connectors are available, an arbitrary number of valves can be mutually interconnected by means of these pre-assembled cables.

In an advanced embodiment of the invention, the valve housing is provided with two electric connector cables, wherein each connector cable is provided with an electric plug connector, and wherein the plug connectors are of mutually matching design.

The cables are, for example, for standard nozzle distances of 50 cm provided on each valve. Thereby, the feed throughs of the connector cables traversing the valve housing can be sealed reliably, since they are attached already during production of the valve. During installation of the valve assembly on a field sprayer, errors are prevented in that the plug connectors of different valves can be inserted one into the other only in the correct way. Thus, the installation effort is reduced and a simple and faultless installation is ensured. Furthermore, there is less effort and expenditure for storage and logistics on the side of the manufacturer. Extension cables are provided for installation on joints on the linkage of the field sprayer or for connection of the valves to a central control unit of the field sprayer. In addition to the reduced effort and expenditure in installation, the valve thereby also has an easy to maintain design. In case a valve needs to be replaced, there is no risk of incorrect valve connection. By appropriate design of the valve control, there is automatic configuration.

In an advanced embodiment of the invention, a valve control is arranged within the housing and configured for operation on a bus line.

The operation on a bus line facilitates control of the valves according to the invention considerably. The individual valves can be interconnected serially, and are then controlled using bus signals. For example, a four-wire cable can be used. The individual valves can be configured in a simple and user-friendly manner by means of relaying on the circuit board after installation on the machine or after a repair intervention. The control unit automatically conducts a query of the individual positions of the valves and stores them. Furthermore, there is also a possibility to allow signal exchange between the individual valves during a status check. In this manner, a cable failure or a disconnected plug connection may also be located. For example, when ten valves are serially connected and during a status check only the first five valves respond, then it can be assumed that there is a cable failure or a disconnection between the fifth and the sixth valve. The valve control receives signals from a superior control unit, for example, on a tractive vehicle, and converts them into control signals for the step motor. The valve control also monitors the input voltage and output voltage of the valve, for example. If the valve control detects that the input voltage has decreased below a predefined value, an emergency operation is initiated, in that a second, higher voltage is applied to the electric motor in a boost operation mode, and then the motor can displace the valve body and/or the valve seat into a predefined emergency position. By means of the valve control, the charging condition of the energy storage device is monitored as well, and a buck operation mode for charging the energy storage device using low power input is adjusted, as required.

The problem underlying the invention is also solved by a field sprayer comprising the valve assembly according to the invention. Advantageously, the valves are mutually interconnected electrically by means of a cable supply line, wherein the cable supply line from a first valve to a second adjacent valve is plugged into the first plug connector and the cable supply line from the first valve to a third adjacent valve is plugged into the second plug connector.

In this manner, a modular construction can be obtained, and valves arranged adjacently on the linkage of the field sprayer can be connected by means of pre-assembled cables without difficulty.

In an advanced embodiment of the invention, each valve housing is provided with two electric connector cables, each including an electric plug connector, wherein the valves are mutually interconnected by means of the connector cables, and wherein a first connector cable of a first valve leads to a connector cable of a second, adjacent valve and a second connector cable of the first valve leads to a connector cable of a third, adjacent valve.

BRIEF DESCRIPTION OF THE DRAWINGS

Further features and advantages of the invention will become apparent from the claims and the description hereinbelow of preferred embodiments of the invention in connection with the drawings. Individual features of the different embodiments and their illustration in the drawings can be combined in any arbitrary way without exceeding the scope of the invention. In the drawings:

FIG. 11 shows a side view of a valve according to the invention according to a second embodiment;

FIG. 12 shows a front view of the valve according to FIG. 11;

FIG. 13 shows a top view of the valve according to FIG. 11;

FIG. 14 shows a partial sectional view of the valve according to FIG. 13;

FIG. 15 shows a partial sectional view of the valve according to FIG. 12;

FIG. 16 shows a partial sectional view of the valve according to FIG. 11; and

FIG. 17 shows an illustration of portions of a valve assembly according to the invention including a plurality of valves according to the invention.

DETAILED DESCRIPTION

Figure 1:
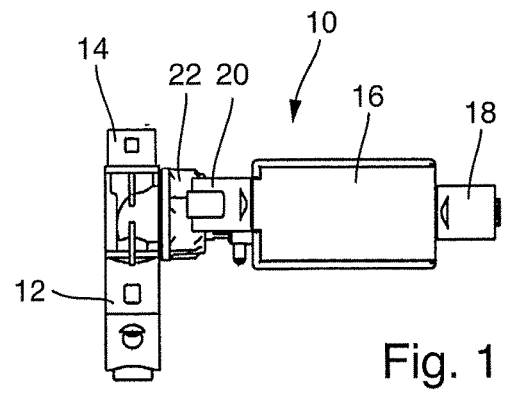
FIG. 1 shows a front view of a valve according to the invention according to a first embodiment.

FIG. 1 shows a valve 10 according to the invention disposed on a nozzle support 12. The nozzle support 12 is attached to a not illustrated feed pipe and has a connector unit 14 for mounting a not illustrated spray nozzle. Liquid to be sprayed passes from the nozzle tube through the nozzle support 12 to the connector unit 14 and to the spray nozzle. This flow communication between the nozzle tube and the spray nozzle can be disabled or enabled by means of the valve 10.

The valve 10 has a valve housing 16, wherein a valve body, a valve seat, a step motor for moving the valve body, an electric energy storage device, and a valve control circuit are arranged, as will be further explained with reference to FIGS. 5 to 7. The valve housing 16 is provided with two electric plug connectors 18 and 20, and into each thereof a cable supply line can be plugged in. The valve housing 16 is attached to a matching exterior threaded flange of the nozzle support 12 by means of a lock nut 22.

Figure 2:
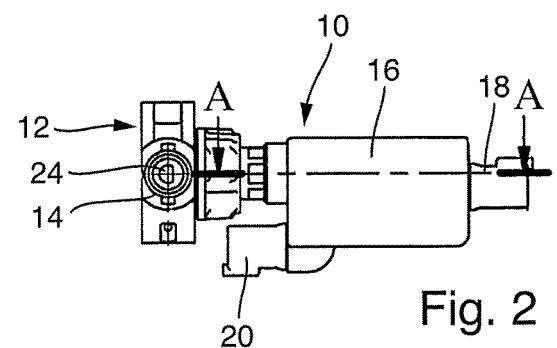
FIG. 2 shows a side view of the valve according to FIG. 1.

The illustration of FIG. 2 shows a view of the valve 10 and the nozzle support 12 from below. Apparent are the connector unit 14 for the spray nozzle and a channel 24 within the nozzle support 12, which channel can be enabled or disabled by means of the valve body of the valve 10, as explained above.

Figure 3:
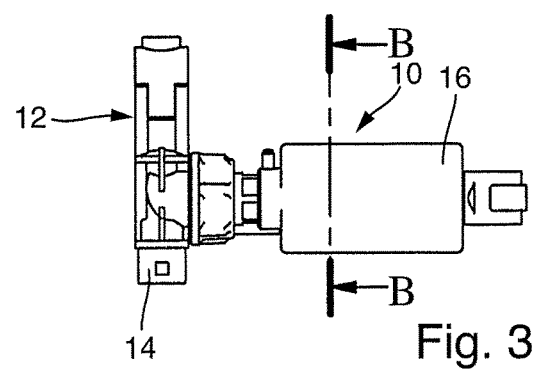
FIG. 3 shows a rear view of the valve according to FIG. 1.

The illustration of FIG. 3 shows a side view of the valve 10 and the nozzle support 12. According to this view, the connector unit 14 for the spray nozzle is arranged at the bottom.

Figure 4:
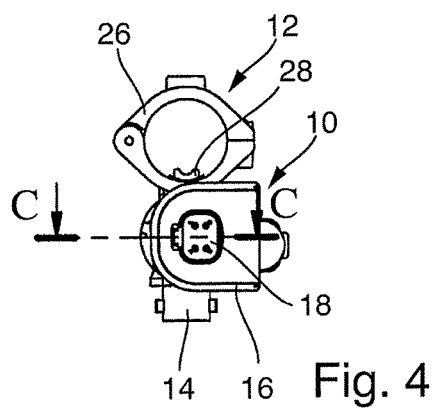
FIG. 4 shows a front view of the valve according to FIG. 1.

The illustration of FIG. 4 shows a rear view of the valve 10 and the nozzle support 12. The nozzle support 12 has a collar 26 which can be placed around a not illustrated feed pipe, in order to fix the nozzle support 12 to said feed pipe. The feed pipe has an opening on its bottom side and a tube adaptor 28 of the nozzle support 12 engages therein. Via said tube adaptor 28 the liquid to be sprayed passes into the nozzle support 12 and finally to the connector unit 14 for a spray nozzle.

In the illustration of FIG. 4 the plug connector 18 is indicated. The plug connector 18 includes a total of four contacts and is provided for a four-wire cable.

Referring to the views of FIGS. 1 to 4, it is apparent that the valve housing 16 is closed, in order to accommodate the components of the valve 10 therein protected against contamination and liquid.

Figure 5:
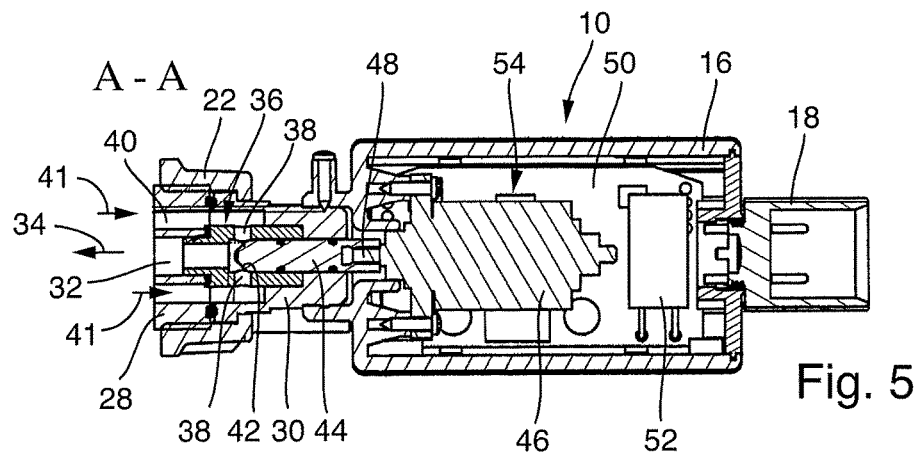
FIG. 5 shows a view on sectional plane A-A in FIG. 2.

FIG. 5 shows a view on the sectional plane A-A of FIG. 2. The nozzle support 12 is illustrated merely in portions and, specifically, only an exterior threaded flange 28 of the nozzle support 12 is illustrated, where the lock nut 22 of the valve is screwed thereon and a connector adaptor 30 of the nozzle 10 is placed thereon. In the illustration of FIG. 5 is apparent that the liquid to be sprayed flows into an annular channel 40 of the exterior threaded flange 28 in the direction of the arrows 41, and thus passes to a valve seat 36 of the valve 10. Starting from the valve seat 36, the liquid to be sprayed flows via two transverse holes 38 into a central channel 32 which is surrounded by the annular channel 40. In the central channel 32, the liquid flows in the direction of the arrow 34. The valve seat component 36 includes the actual valve seat 42, which seat is adapted to be closed or enabled by means of a valve body 44. In the illustration of FIG. 5, the valve seat is enabled and liquid to be sprayed can pass from the annular channel 40 through the valve seat 42 and enter into the central channel 32. When moving the valve body 44 from the enable position in the illustration of FIG. 5 to the left hand side in FIG. 5 until the rounded front end of the body abuts on the valve seat 42, a flow communication between the central channel 32 and the annular channel 40 is discontinued. Thus, the valve 10 is in a disable position.

The valve body 44 has a rod shape and is moved by means of an electric step motor 46. The step motor 46 rotates a screw spindle 48, which spindle in turn is arranged in a matching internal thread of a blind hole of the valve body 44. Rotation of the step motor 46 causes an axial movement of the screw spindle 48 and a shifting movement of the valve body 44, starting from the illustration of FIG. 5 to the left hand side in the direction towards the valve seat 42. Starting from the disable position, the screw spindle 48 is turned in the inverse direction, in order to move the valve body 44 away again from the valve seat 42 and to move the valve 10 into the enable position.

Within the valve housing 16, a circuit board 50 is arranged besides the step motor 46, where on the board, a valve control circuit 54 is arranged besides a supercapacitor 52 and visible merely in portions in FIG. 5. FIG. 5 illustrates that the circuit board 50 together with the supercapacitor 52 and the valve control circuit 54 is arranged within the valve housing 16. The step motor 46 is also disposed within the valve housing 16. The entirety of electric and electronic components of the valve 10 is, thus, disposed and shielded within the valve housing 16. The valve control circuit 54 is designed for bus operation, in particular for operation using a CAN (controller area network) bus. The connector units of the plug connectors 18, 20 are connected to the valve control circuit 54.

Figure 6:
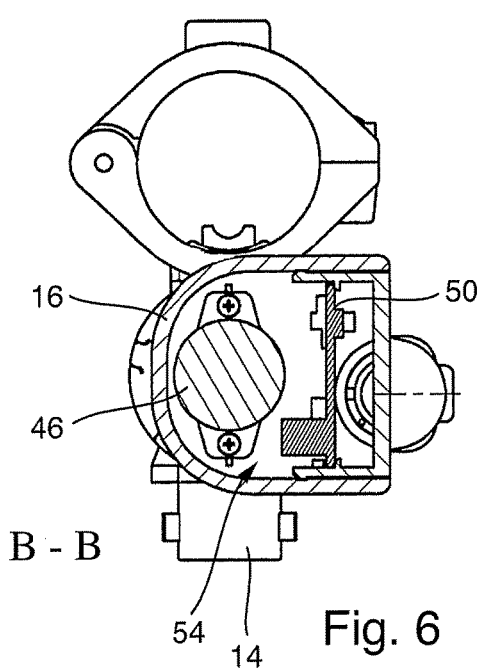
FIG. 6 shows a view on sectional plane B-B in FIG. 3.

FIG. 6 shows a view on the sectional plane B-B in FIG. 3. Illustrated within the valve housing 16 are the step motor 46 and the circuit board 50 with the valve control circuit 54. The valve control circuit 54 includes a voltage converter which, in a first operation mode, also referred to as boost operation mode, can convert a first voltage provided by the supercapacitor 52 acting as an energy storage device into a second, higher voltage to be applied to the step motor 46. Owing to this higher output voltage, the step motor 46 can provide a higher torque, in order to reliably move the valve body 44—starting from an enable position into a disable position—or vice versa.

Said boost operation mode of the valve control circuit 54 is adjusted in any case, when a failure of an external energy supply of the valve 10 has been detected. During normal operation, an external supply voltage is applied to the step motor, which voltage is provided by the electric system of a tractive vehicle, for example. The boost operation mode is adjusted in that, using the valve control circuit 54, the input voltage and the output voltage of the valve 10 are monitored. If the input voltage decreases below a predefined value, then a failure of the external energy supply is assumed and the voltage converter is shifted to the boost mode and the valve 10 is moved into the disable position. Typically, upon a failure of the external energy supply, the valve 10 is moved into the disable position. However, there are definitely country-specific directives demanding that in case of a failure of the external energy supply, the valve 10 is moved into an enable position. Even said movement into the enable position would be performed in the boost operation mode of the valve control circuit 54. However, the boost operation mode can be adjusted always in case the valve 10 is to be closed or opened, in particular in case that a plurality of valves 10 is to be opened simultaneously. The boost operation mode then ensures that an electric energy supply, for example, of a field sprayer, is not overloaded even during simultaneous actuation of a plurality of valves.

By means of the valve control circuit 54 even the charging condition of the supercapacitor 52 is monitored. If the valve control circuit 54 detects that the supercapacitor 52 falls below a predetermined charging condition, then the valve control circuit 54 adjusts a so-called buck operation mode, wherein the supercapacitor 52 is charged during a somewhat longer period of time using a low power input. To that end, the voltage converter is a so-called buck/boost converter and, thus, allows power flow in two opposite directions, namely, during a boost operation mode, from the supercapacitor 52 via the voltage converter to the step motor 46, and during a buck operation mode, from the external electric energy supply to the supercapacitor 52.

Figure 7:
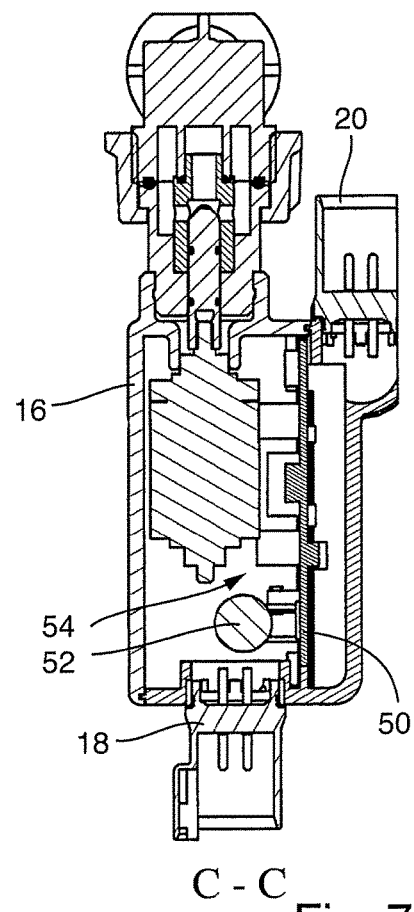
FIG. 7 shows a view on sectional plane C-C in FIG. 4.

The illustration of FIG. 7 shows a view on the sectional plane C-C in FIG. 4. In this illustration, the circuit board 50 arranged within the valve housing 16 together with the supercapacitor 52 and the valve control circuit 54 is clearly apparent. Also apparent is that between the plug connectors 18, 20 and the circuit board 50 there are merely very short lengths to be bridged. The electric signals are transmitted from the input plug connector 20 to the output plug connector 18 by means of a relaying on the circuit board.

Figure 8:
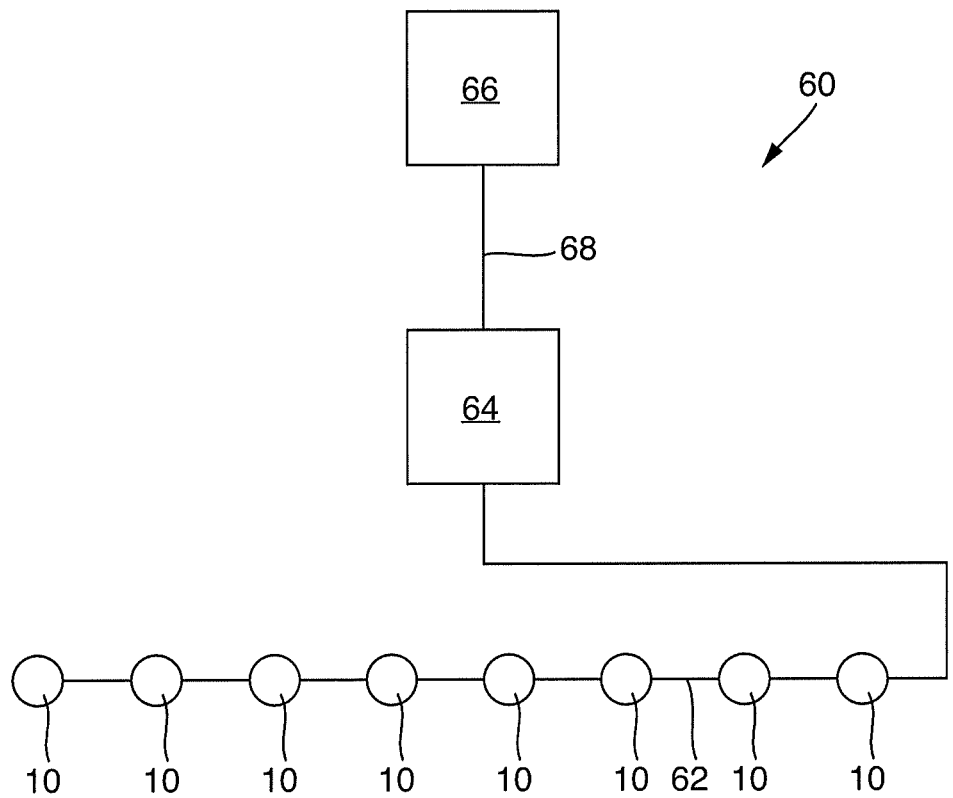
FIG. 8 shows a diagrammatic illustration of a field sprayer according to the invention.

The illustration of FIG. 8 shows diagrammatically a field sprayer 60 according to the invention including a total of eight valves 10 according to the invention. Liquid conduits are not illustrated. What is illustrated is merely one CAN bus line 62 serially interconnecting the individual valves 10 and coming from an individual nozzle control unit 64. The individual nozzle control unit 64 is provided, during normal operation, to control the valves 10 individually or commonly or in groups in such a manner that the valves move from the enable position to the disable position or vice versa. The individual nozzle control unit 64 sends signals to the individual valves 10 and also receives signals from the valves 10. For that purpose, the valve control circuits 54 of the individual valves 10 are designed such that, for example, in response to status requests of the individual nozzle control unit 64, they give a feedback on their status, for example, whether or not they are in operation, actually indeed a feedback on the fact whether the respective valve 10 is in an enable position or in a disable position.

By means of such a status request the individual nozzle control unit 64 can assess, whether or not all the valves 10 on the bus line 62 are ready for operation. In case, for example, the feedbacks of individual valves 10 are missing or an increased power consumption is measured on an individual valve, then not only failure of the respective valve, as the case may be, but also breakage of a cable or a short-circuit can be concluded therefrom, for example. In case, for example, during a status request there is no feedback given to the individual nozzle control unit 64 from the last three valves 10 arranged on the left hand side in FIG. 8, then a cable breakage between the fourth to last and the third to last valve 10 can be concluded therefrom. If the valves 10 do not receive a feedback from the control unit 64, for example, due to a defect in the bus line, then the emergency stop control can also be activated.

In case an energy supply of the individual valves 10 fails, which supply is also via the CAN bus line 62, then the individual valve control circuits 54 detect the failure, as explained above, and said control circuits then cause moving of the valves 10 into the emergency position, in particular the disable position, exclusively using the energy provided by means of the supercapacitor 52.

The field sprayer 60 further includes a central control unit 66 which sends and receives signals to and from the individual nozzle control unit 64 via an ISO bus line 68. The central control unit 66 includes, for example, a navigation module and decides, based on the current position of the field sprayer 60, which of the valves 10 are to be switched on and off. The corresponding commands are then sent to the individual nozzle control unit 64, then, the commands are implemented by the control unit and transmitted to the valves 10. If need be, the individual nozzle control unit 64 can also be integrated in the central control unit 66.

Figure 9:
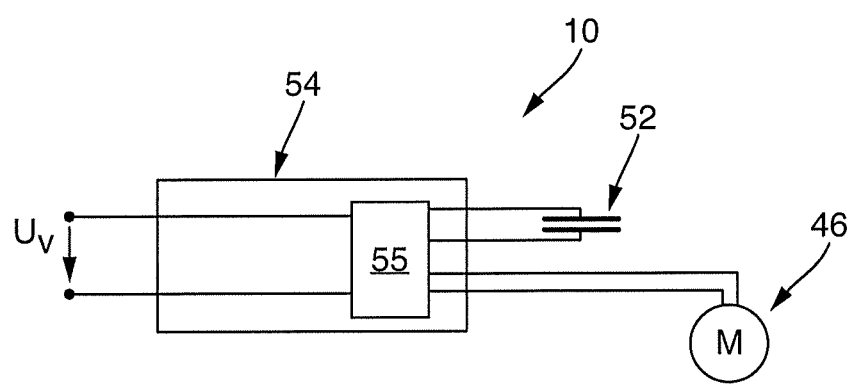
FIG. 9 shows a diagrammatic equivalent circuit diagram of a valve according to the invention.

In FIG. 9 is illustrated a diagrammatic equivalent circuit diagram of a valve 10 according to the invention. The valve 10 includes the valve control circuit 54 which is provided with the voltage converter 55, wherein the supercap is coupled via the buck/boost control. The supercapacitor 52 and also the step motor 46 are connected to the voltage converter 55. Furthermore, the voltage converter 55 is connected to an external energy supply having a supply voltage $U_v$ which is provided, for example, by the electric system of a tractive vehicle.

During normal operation the valve control circuit 54 receives a signal from the individual nozzle control unit 64, cf. FIG. 8, and then applies the supply voltage $U_v$ to the electric motor, here implemented as step motor 46, in order to open or close the valve 10 thereby. Thus, it is possible to apply voltage to the electric motor while bypassing the buck/boost control of the voltage converter 55, even though the diagrammatic illustration of FIG. 9 does not reveal this. Therefore, during normal operation, the supercapacitor 52 is not used, instead the step motor 46 is driven exclusively by means of the external energy supply.

The external supply voltage $U_v$ is permanently monitored by means of the valve control circuit 54. In case the valve control circuit 54 detects that the supply voltage $U_v$ has decreased below a predefined value, then a failure of the external energy supply is assumed and the buck/boost converter is shifted to a boost operation mode, wherein the voltage provided by the supercapacitor 52 is converted into a higher voltage to be applied to the electric motor 46. During said boost operation the valve 10 is then closed exclusively using the electric energy provided by the supercapacitor 52. As explained above, according to country-specific directives, there can be enabling of the valve 10 provided in an emergency operation.

In addition to adjusting the boost operation mode to move the valve 10 into an emergency position in case of failure of the external power supply, the valve control circuit 54 also monitors the output voltage and/or the charging condition of the supercapacitor 52. In case the valve control circuit 54 detects that the charging condition of the supercapacitor 52 is below a predefined limit value, then the buck/boost control of the voltage converter 55 is shifted to a buck operation mode, wherein the supercapacitor 52 is then charged by means of the buck/boost control of the voltage converter 55 using the external energy supply mains. During said buck operation, the buck/boost converter 55 provides for a low power input during charging the supercapacitor 52, so that the external energy supply will not be overloaded even in case that, for example, all supercapacitors 52 of the plurality of valves 10 are charged simultaneously.

Figure 10:
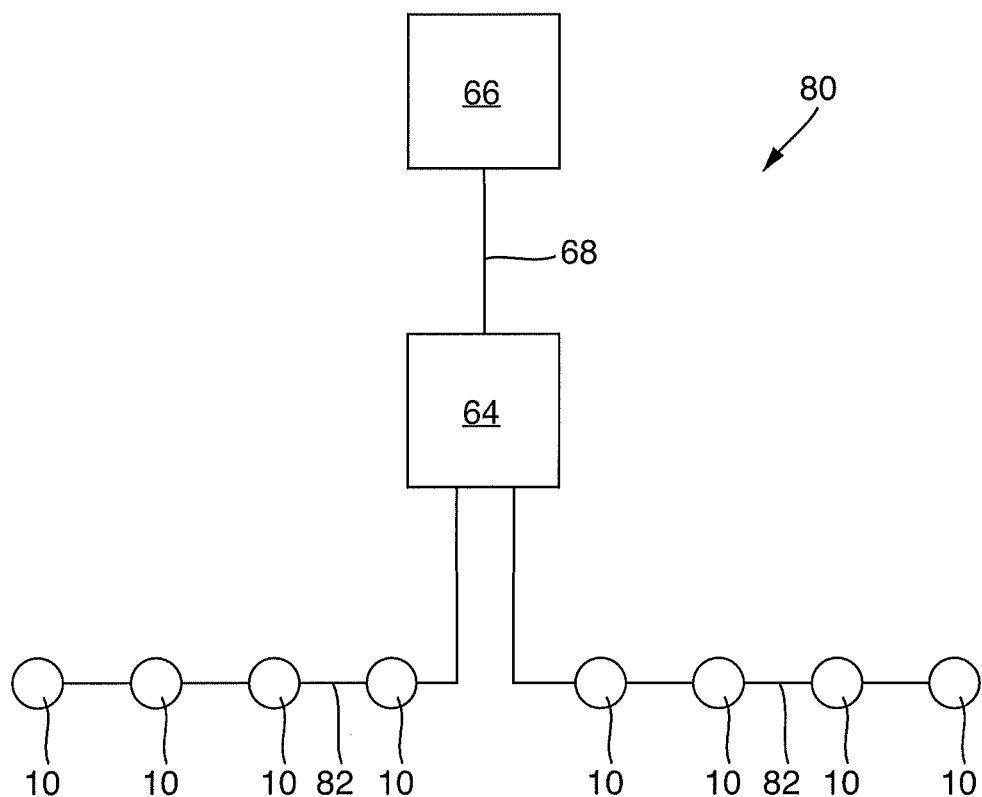
FIG. 10 shows a diagrammatic illustration of a field sprayer according to the invention according to another embodiment of the invention.

FIG. 10 shows a diagrammatic illustration of a field sprayer 80 according to another embodiment of the invention. Issuing from the individual nozzle control unit 64, the valves 10 are mounted to the linkage of the field sprayer, each valve with a line to the left and to the right hand side. Configuration is then performed automatically starting from one side. In contrast to the field sprayer 60 according to FIG. 8, the bus line and/or the cable 82 do not have to be passed from one end of the linkage to the other, but the bus line extends starting from the middle of the linkage to the left and to the right hand side. The field sprayer 80 includes a central control unit 66 which is connected via a line 68 or also a plurality of lines to the individual nozzle control unit 64.

The illustration of FIG. 11 shows a side view of a valve 100 for a valve assembly according to the invention. The valve 100 is provided with a valve housing 102 which is attached to a matching thread of a nozzle support 106 by means of a lock nut 104. The nozzle support 106 is attached to a not illustrated feed pipe, as explained with reference to the nozzle support 12 in FIG. 1, and has a connector unit 108 for attaching a not illustrated spray nozzle. A flow communication between the feed pipe and the spray nozzle and the connector unit 108, respectively, can be disabled or enabled by means of the valve 100.

The valve 100 has, similar to the valve 10 according to FIG. 1, a valve body, a valve seat, a step motor for moving the valve body, an electric energy storage device, and a valve control circuit. To avoid repetitions, merely those components of the valve 100 are explained that differ from the valve 10 according to FIG. 1.

Specifically, the valve 100 is provided with two connector cables 110, 112, wherein the first connector cable 110 is provided with an electric plug connector 114 and the second connector cable 112 is provided with a second plug connector 116. The first plug connector 114 is a plug, the second plug connector 116 is a socket, wherein the two plug connectors 114, 116 are of matching design. However, the two plug connectors 114, 116 are not intended to be inserted one into the other. In fact, the first plug connector 114 of the valve 100 is to be connected to a second plug connector of an identical, adjacent valve. The second plug connector 116 of the valve 100 is to be connected to the first plug connector of a further, adjacent valve. A valve assembly obtained thereby will be further explained with reference to FIG. 17. The two connector cables 110, 112 are provided for standard nozzle distances of 50 cm and integral on the valve 100. A feed through of the two connector cables 110, 112 into the valve housing 102 can thus be sealed reliably. Since the connector cables 110, 112 are already fixed to the valve housing 102, mounting of the valve 100 is significantly facilitated and, especially, errors during installation or repair of a valve assembly according to the invention on a field sprayer are virtually excluded. Also, the expenditure for stock-keeping is reduced, since there is no need to keep separate connector cables ready for the valves 100. Merely in the region of articulations on the linkage of a field sprayer or for connection of the valves to an individual valve control unit, cf. FIG. 17, there may be need for extension cables.

The valve housing 102 has a bottom part 118 and a cover 120. The bottom part 118 and the cover 120 are potted together, what will be explained further hereinafter. The cover 120 is provided with a ventilation hole 122 which allows pressure compensation between the interior of the housing 102 and the environment. Therein, the ventilation hole 122 is closed by an air-permeable but water-impermeable membrane. The membrane is not visible in the illustration of FIG. 11, since it is in a recessed position, in order to prevent damage of the membrane by external impact, for example, during blasting using a high-pressure cleaner.

In the illustration of FIG. 12 the valve 100 is illustrated in a front view. Apparent are the nozzle support 106 and the two-part housing 102 having the cover 120 and the bottom part 118. The bottom part 118 overlaps the cover 120 in portions, wherein the cover 120 is potted with the housing 118 in this region, as already explained. The connector cables 112, 110 are led out of the bottom part 118. In the illustration of FIG. 12 the second electric plug connector 116 is visible from the front side.

The illustration of FIG. 13 shows a view of the valve 100 according to FIG. 11 from above. In this view the cover 120 and an upper edge of the bottom part 118 are apparent, where the upper edge overlaps the cover 120 in portions, cf. FIG. 12.

The illustration of FIG. 14 shows a sectional view of the valve 100 in the position according to FIG. 13, that is, in a top view. The sectional plane extends through the drive shaft of an electric motor 124 in the valve housing 102. The structures of the electric motor 124 and of the valve mechanism 126 do, however, not differ from the embodiment according to FIGS. 1 to 7, see especially FIG. 5 and FIG. 7, so that a repeated explanation is omitted.

Apparent in FIG. 14 is the structure of the ventilation hole 122. A through hole is closed by a membrane 128 in the interior of the housing, which membrane is, as explained above, air-permeable but water-impermeable. An insert 130 in the through hole is in a meander shape and, thereby, allows passage of air, but prevents that, for example, a water jet of a high-pressure cleaner may directly impact on the membrane 128. Via the ventilation hole 122, the interior of the valve housing 102 can be vented, and thus, for example, formation of condensed water in the interior of the housing 102 can also be prevented.

A circuit board 132 is visible in the interior of the housing 102, whereon electronic components are illustrated merely diagrammatically, which components are a voltage converter and a valve control circuit. As well arranged on the circuit board 132 is a supercapacitor 134.

The interior of the housing 102 is also apparent in the illustration of FIG. 15. The bottom part 118 is provided with a groove-type texture 136 on the top surface thereof, and the cover 120 engages in said texture. Said groove 136 is potted after inserting the cover 120, so that the valve housing 102 is reliably sealed against external impacts, with the exception of the ventilation hole 122.

The circuit board 132 is arranged in the bottom part 118. Apparent in FIG. 15 is a feed through 138 for one of the connector cables. The circuit board 132 together with the electronic components arranged thereon and the supercapacitor 134 and also the through holes 138 for the connector cables are potted using a potting compound 140. The potting compound 140 extends up to a plane 142. Merely the electric motor 124 is disposed above the potting compound 140. The complete electronics and also the supercapacitor 134 as an energy storage device and the cable feed throughs 138 are disposed within the potting compound 140, and thereby are reliably water-tight.

In the illustration of FIG. 16 another sectional view in a lateral position is illustrated.

The illustration of FIG. 17 shows a valve assembly 150 according to the invention composed of a total of three valves 100. The valve assembly 150 is illustrated merely in portions, for example, 48 valves can be mutually interconnected by the ways and means as illustrated in FIG. 17. Using the plug connector 114, a first connector cable 110 of the middle valve 100 in FIG. 17 is inserted into the plug connector 116 of the second connector cable 112 of the left hand valve 100 in FIG. 17. Using its plug connector 116, the second connector cable 112 of the middle valve 100 is inserted into the plug connector 114 on the first connector cable 110 of the right hand valve 100 in FIG. 17. The second connector cable 112 of right hand valve 100 in FIG. 17 is connected to an individual nozzle control unit 64, which can be connected to a central control unit on a field sprayer, cf. FIG. 10. Connection to the individual nozzle control unit 64 is via the plug connector 116 on the second connector cable 112 of right hand valve 100 in FIG. 17. Evidently, the valve assembly 150 can be constructed in a very simple manner and errors during electric connection of the valves 100 can be virtually excluded. Even replacing of one of the valves 100 can be done in a very simple manner. During replacement of one of the valves 100 and during the first installation of the valve assembly 150, there is an automatic configuration of the valves 100 using the individual nozzle control unit 64. The valves 100 are connected by means of a bus line and communicate via a bus protocol.

The invention claimed is:

1. A valve assembly having a plurality of valves for spraying devices for agricultural technology, wherein the valves each include a valve body, which is capable of assuming at least one enable position and one disable position relative to a valve seat, an electric motor for moving the valve seat and/or the valve body into the at least one enable position and the disable position, and an electric energy storage device for providing electric energy for the electric motor, wherein a voltage converter is provided and configured, in a first operation mode, to convert a first voltage provided by the energy storage device into a second, higher voltage to be applied to the electric motor during moving the valve body and/or the valve seat and, in a second operation mode, to charge the energy storage device with low power input.

2. The valve assembly according to claim 1, wherein the voltage converter is configured to control or to regulate power input to the energy storage device in the second operation mode.

3. The valve assembly according to claim 1, wherein, in the second operation mode, a third voltage for charging the energy storage device is lower than a supply voltage of the voltage converter.

4. The valve assembly according to claim 1, wherein the voltage converter is a direct current (DC) voltage converter.

5. The valve assembly according to claim 1, wherein the energy storage device is a capacitor.

6. The valve assembly according to claim 1, further including a valve housing, wherein the electric motor, the voltage converter, the energy storage device, and a valve control circuit for the electric motor and the voltage converter are arranged within the valve housing, and wherein the voltage converter, the energy storage device and the valve control circuit are encased by a water-tight potting compound.

7. The valve assembly according to claim 6, wherein a cover of the valve housing is sealed by the potting compound.

8. The valve assembly according to claim 6, wherein the valve housing is provided with a ventilation hole, wherein the ventilation hole is closed by a water-tight but air-permeable membrane.

9. The valve assembly according to claim 6, wherein the valve housing is provided with two electric plug connectors.

10. The valve assembly according to claim 6, wherein the valve housing is provided with two electric connector cables, wherein each connector cable is provided with an electric plug connector, and wherein the plug connectors are of mutually matching design.

11. The valve assembly according to claim 6, wherein the valve control circuit is arranged within the valve housing and configured for operation on a bus line.

12. A field sprayer including the valve assembly according to claim 1.

13. The field sprayer according to claim 12, wherein a housing of each valve is provided with first and second electric plug connectors and the valves are mutually interconnected electrically by a cable supply line, wherein the cable supply line from a first one of the valves to a second adjacent one of the valves is plugged into the first plug connector and the cable supply line from the first one of the valves to a third adjacent one of the valves is plugged into the second plug connector.

14. The field sprayer according to claim 12, wherein a valve housing of each valve is provided with first and second electric connector cables each provided with an electric plug connector, wherein the valves are mutually interconnected by the connector cables, and wherein the first connector cable of a first one of the valves leads to the first connector cable of a second adjacent one of the valves and the second connector cable of the first one of the valves leads to the second connector cable of a third adjacent one of the valves.

* * * * *